(12) United States Patent
Hellenbrand

(10) Patent No.: US 12,006,164 B2
(45) Date of Patent: Jun. 11, 2024

(54) OPERATING DEVICE FOR PLACING OR RETRIEVING BOTTLE-LIKE PIECE GOODS

(71) Applicant: Becton Dickinson Rowa Germany GmbH, Kelberg (DE)

(72) Inventor: Christoph Hellenbrand, Kelberg (DE)

(73) Assignee: BECTON DICKINSON ROWA GERMANY GMBH, Kelberg (DE)

( * ) Notice: Subject to any disclaimer, the term of this patent is extended or adjusted under 35 U.S.C. 154(b) by 0 days.

(21) Appl. No.: 18/197,268

(22) Filed: May 15, 2023

(65) Prior Publication Data

US 2023/0278809 A1    Sep. 7, 2023

Related U.S. Application Data

(63) Continuation of application No. 17/528,876, filed on Nov. 17, 2021, now Pat. No. 11,713,200, which is a
(Continued)

(51) Int. Cl.
*B65G 47/90* (2006.01)
*B25J 15/00* (2006.01)

(52) U.S. Cl.
CPC .......... *B65G 47/90* (2013.01); *B25J 15/0038* (2013.01); *B65G 47/902* (2013.01); *B65G 2201/0244* (2013.01)

(58) Field of Classification Search
CPC .. B25J 15/0033; B25J 15/0038; B25J 15/022; B25J 15/0226; B25J 15/0266;
(Continued)

(56) References Cited

U.S. PATENT DOCUMENTS

| 4,132,318 A | 1/1979 | Wang |
| 4,300,330 A | 11/1981 | Hartness |

(Continued)

FOREIGN PATENT DOCUMENTS

| CN | 105705441 A | 6/2016 |
| CN | 205906698 U | 1/2017 |

(Continued)

OTHER PUBLICATIONS

Japanese Office Action for Application No. 2021-519169, dated Aug. 22, 2023, 9 pages including translation.
(Continued)

*Primary Examiner* — Dean J Kramer
(74) *Attorney, Agent, or Firm* — Morgan, Lewis & Bockius LLP

(57) ABSTRACT

An operating device for placing or retrieving piece goods onto or from storage places of a picking device is provided. The operating device includes a gripping jaw assembly having two gripping jaws with opposite lying inner surfaces extending in a first horizontal direction corresponding to a direction for placing and retrieving piece goods. The gripping jaws are configured so that the distance of the inner surfaces from each other tapers in the downward direction at least in sections and the piece goods can be lifted from below or the gripping jaws can be moved to clamp the piece goods between them. The operating device also includes an actuation unit coupled to the gripping jaw assembly for moving the gripping jaw assembly in the first horizontal direction.

17 Claims, 7 Drawing Sheets

Related U.S. Application Data continuation of application No. 16/552,989, filed on Aug. 27, 2019, now Pat. No. 11,180,326, which is a continuation of application No. 16/154,006, filed on Oct. 8, 2018, now Pat. No. 10,435,252.

(58) Field of Classification Search
CPC ...... B25J 15/028; B65G 47/90; B65G 47/902; B65G 2201/0244
See application file for complete search history.

(56) References Cited

U.S. PATENT DOCUMENTS

| | | | |
|---|---|---|---|
| 4,395,069 | A | 7/1983 | Lebret |
| 4,941,699 | A | 7/1990 | Wilfong |
| 5,042,862 | A | 8/1991 | Tubke |
| 6,109,677 | A | 8/2000 | Anthony |
| 6,431,817 | B1 | 8/2002 | Simkowski |
| 6,769,856 | B2 | 8/2004 | Padovani |
| 8,267,452 | B2 | 9/2012 | Weber |
| 8,376,428 | B2 | 2/2013 | Rebstock |
| 8,414,042 | B2 | 4/2013 | Landes |
| 8,632,110 | B2 | 1/2014 | Waizenegger |
| 9,493,315 | B2 | 11/2016 | Ouellette |
| 9,771,216 | B2 * | 9/2017 | Hellenbrand ........ B65G 47/905 |
| 10,435,252 | B1 | 10/2019 | Hellenbrand |
| 11,180,326 | B2 | 11/2021 | Hellenbrand |
| 2008/0152466 | A1 | 6/2008 | Bonora et al. |
| 2009/0136331 | A1 | 5/2009 | Muser |
| 2010/0108625 | A1 | 5/2010 | Meers et al. |
| 2011/0008138 | A1 | 1/2011 | Yamashita |
| 2011/0156332 | A1 | 6/2011 | Kishimoto |
| 2014/0224826 | A1 | 8/2014 | Otzen |
| 2014/0262685 | A1 | 9/2014 | Job |
| 2016/0200513 | A1 | 7/2016 | Hellenbrand et al. |

FOREIGN PATENT DOCUMENTS

| | | |
|---|---|---|
| CN | 106882553 A | 6/2017 |
| DE | 102011084634 A1 | 4/2013 |
| EP | 2163507 A1 | 3/2010 |
| EP | 2256703 A1 | 12/2010 |
| EP | 3170771 A1 | 5/2017 |
| JP | S62105804 A | 5/1987 |
| JP | H0748004 A | 2/1995 |
| JP | 2006137577 A | 6/2006 |
| JP | 2017095199 A | 6/2017 |
| WO | WO-2015038999 A2 | 3/2015 |
| WO | WO-2015069105 A1 | 5/2015 |

OTHER PUBLICATIONS

International Search Report and Written Opinion for Application No. PCT/EP2019/077117, dated Jan. 9, 2020, 24 pages including translation.
Brazilian Office Action for Application No. BR112021005148-1, dated Jan. 6, 2023, 6 pages including machine translation.
Chinese Office Action for Application No. 201980066168.3, dated Jul. 5, 2022, 23 pages including translation.
European Office Action for Application No. 18199138.1, dated Apr. 25, 2023, 17 pages including machine translation.
European Office Action for Application No. 18199138.1, dated Dec. 12, 2022, 13 pages including machine translation.
Extended European Search Report for Application No. 18199138.1, dated Apr. 11, 2019, 17 pages including machine translation.
India Office Action for Application No. 202147020467, dated Oct. 21, 2022, 7 pages.
Singapore Office Action for Application No. 11202102397Q, dated Jul. 27, 2022, 10 pages.

* cited by examiner

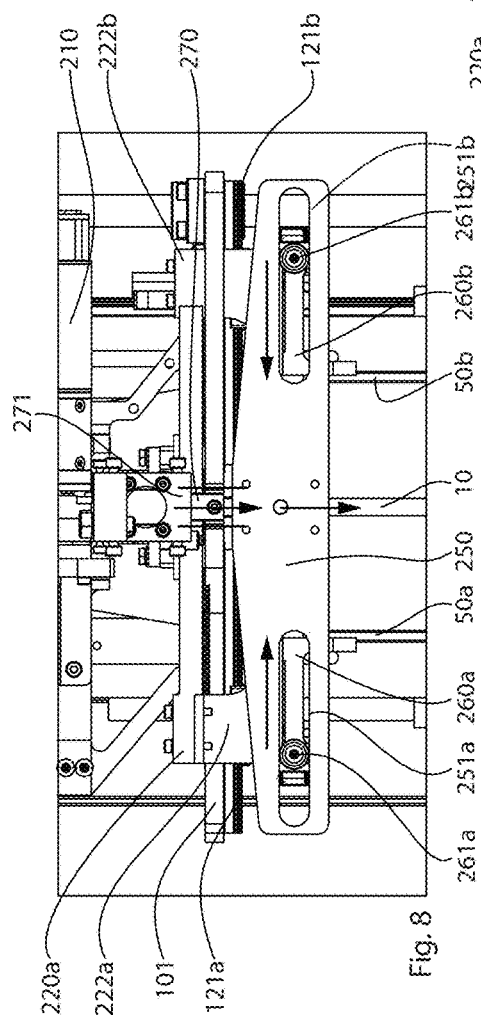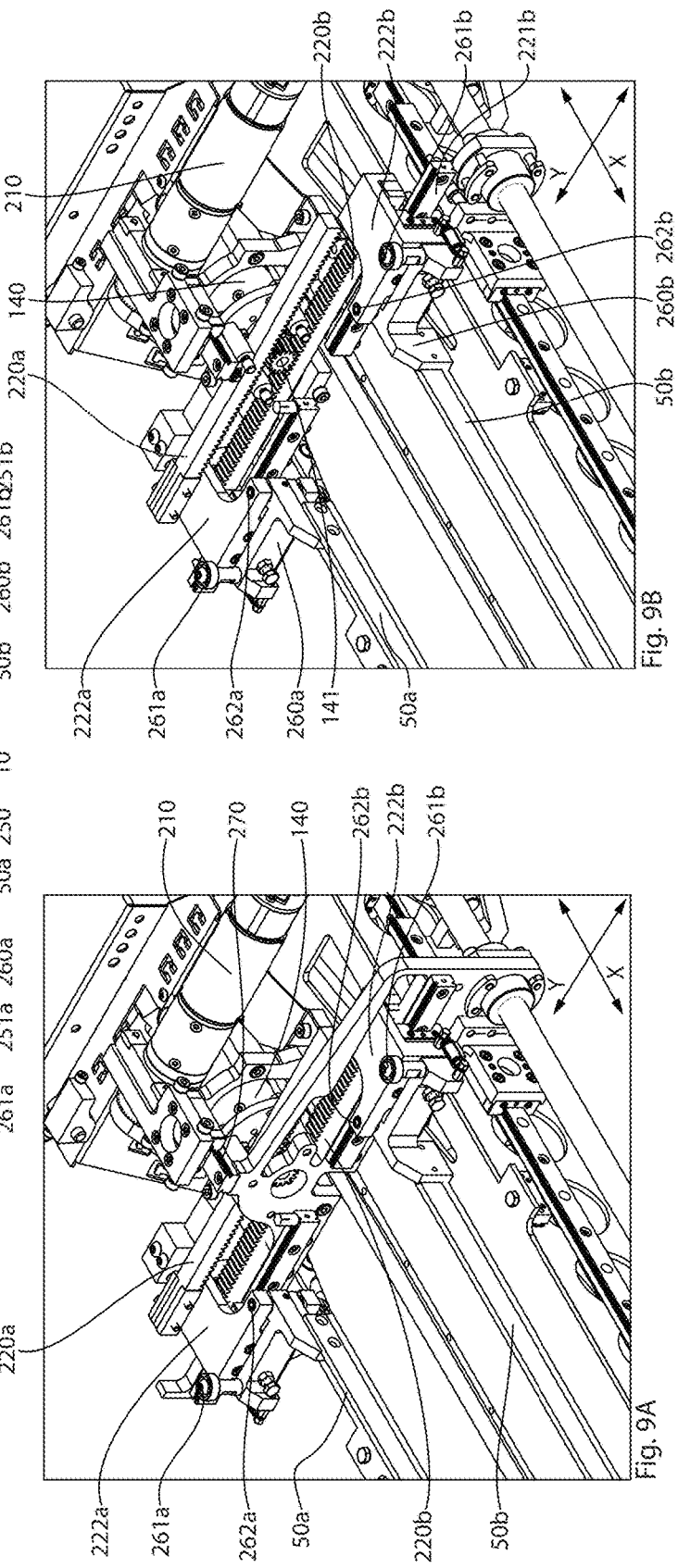

OPERATING DEVICE FOR PLACING OR RETRIEVING BOTTLE-LIKE PIECE GOODS

CROSS-REFERENCES TO RELATED APPLICATION

This application is a continuation of U.S. application Ser. No. 17/528,876, filed on Nov. 17, 2021, entitled "OPERATING DEVICE FOR PLACING OR RETRIEVING BOTTLE-LIKE PIECE GOODS," which issued as U.S. Pat. No. 11,713,200 on Aug. 1, 2023, which is a continuation of U.S. application Ser. No. 16/552,989, filed Aug. 27, 2019, entitled "OPERATING DEVICE FOR PLACING OR RETRIEVING BOTTLE-LIKE PIECE GOODS," which issued as U.S. Pat. No. 11,180,326 on Nov. 23, 2021, which is a continuation of U.S. application Ser. No. 16/154,006, filed Oct. 8, 2018, entitled "OPERATING DEVICE FOR PLACING OR RETRIEVING BOTTLE-LIKE PIECE GOODS," which issued as U.S. Pat. No. 10,435,252 on Oct. 8, 2019, which are herein incorporated by reference in their entirety.

BACKGROUND

The present disclosure relates to an operating device for placing or retrieving bottle-like piece goods onto or from storage places of a picking device. In particular, the bottle-like piece goods are medicament bottles and similarly shaped medicament packs.

SUMMARY

One or more embodiments provide a method of moving piece goods, the method comprising: moving a gripping jaw assembly comprising first and second gripping jaws disposed opposed to each other along a lengthwise axis, the first and second gripping jaws having inner surfaces, wherein a distance between upper portions of the inner surfaces is greater than a distance between lower portions below the upper portions of the opposed inner surfaces in a first position of the first and second gripping jaws, wherein the moving comprises moving by a first actuation unit the gripping jaw assembly along the lengthwise axis toward a storage place having one or more piece goods; moving, by the first actuation unit, the first and second gripping jaws adjacent a first piece good disposed in a first location of the storage place; engaging, by the first and second gripping jaws, the first piece good; and moving, by the first actuation unit, the first and second gripping jaws away from the first location of the storage place to remove the first piece good from the first location of the storage place.

One or more embodiments provide a method of moving cylindrical piece goods, the method comprising: moving a gripping jaw assembly comprising first and second gripping jaws disposed opposed to each other along a lengthwise axis, the first and second gripping jaws having inner surfaces, wherein a distance between upper portions of the inner surfaces is greater than a distance between lower portions of the opposed inner surfaces in a first position of the first and second gripping jaws, wherein the moving comprises moving, by a first actuation unit, the gripping jaw assembly along the lengthwise axis toward a storage place having one or more piece goods; lifting, by the first and second gripping jaws, a first cylindrical piece good from below; and moving, by the first actuation unit, the first and second gripping jaws to move the first cylindrical piece good to a different location.

The foregoing and other features, aspects and advantages of the disclosed embodiments will become more apparent from the following detailed description and accompanying drawings.

BRIEF DESCRIPTION OF THE DRAWINGS

The device according to the present disclosure and the method according to the present disclosure are described in greater detail below, with reference to the appended drawings.

FIG. 8 shows a partial top view of the operating device of FIGS. 7A and 7B.

FIGS. 9A and 9B show detailed views of the operating device of FIGS. 7A and 7B.

DETAILED DESCRIPTION

Figure 1A:
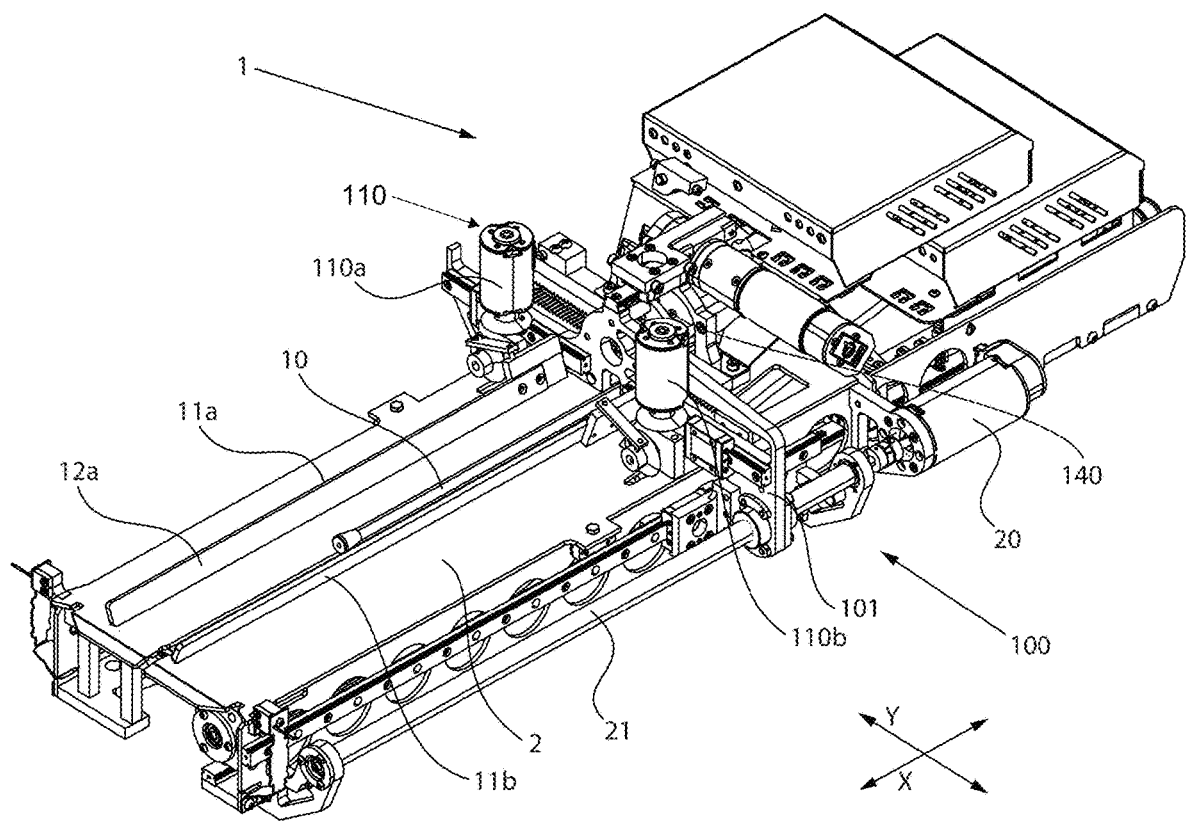
FIGS. 1A and 1B show perspective views of one or more embodiments of an operating device.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

In typical picking devices, a large number of different and differently dimensioned medicament packs are stored chaotically and in a space-optimized manner on elongated flat shelves or are situated on inclined storage shafts. The stored medicament packs are retrieved with the aid of an operating device, for the purpose of which the medicament packs situated on a shelf are moved onto a tray using clamping jaws of the operating device. The gripping jaws of the operating device, in particular, are designed to retrieve and place medicament packs having a square base.

The typical medicament packs to be stored in a picking device differentiate themselves with regard to their dimensions; however, they usually have a plane base and are orthogonally aligned to the base, have parallel side surfaces and end faces, which again are orthogonally aligned with regard to these side surfaces, so that the medicament packs can be pulled, usually using pivotable clamping jaws, from a storage place onto the tray of the operating device.

Using typical operating devices in the picking devices, bottle-like shaped piece goods or medicament packs can only be stored in a standing manner on their usually circular bottom area. Such storing is however not space optimized because the heights of the bottle-like medicament packs greatly differ. Also, starting at a certain weight, it is difficult to pull the medicament packs from a storage place onto the tray using the usually used clamping jaws without the risk of the bottle-like medicament packs tipping over during this movement (and making a further retrieval impossible) or of the clamping jaws bending open during the pulling motion and, for this reason, making the pulling from the storage place impossible. Alternatively, it is possible to store the bottle-like medicament packs in brackets, these brackets being formed like usual medicament packs and correspondingly can be placed or retrieved using known operating devices. This however requires that the medicament bottles before storing are moved into respective brackets and after retrieval are removed from these brackets, which makes the overall handling time consuming. Moreover, different brackets have to be provided for the differently dimensioned bottle-like medicament packs, further complicating the storing of bottle-like medicament packs using the known operating devices.

It is desired to provide an operating device which can place and retrieve bottle-like piece goods, in particular medicament packs, which are horizontal, without using specifically adapted brackets.

One or more embodiments of the operating device include a gripping jaw assembly having two profile-rod shaped gripping jaws, which include opposite lying inner surfaces, extending in a first horizontal direction, the first horizontal direction corresponding to the direction of placing and retrieving piece goods. The gripping jaws are configured in such a manner that the distance of the inner surfaces from each other at least in sections tapers in the downward direction so that the inner surfaces are configured in such a manner that the bottle-like piece goods can be lifted from below. The operating device also includes a first actuation unit coupled with the gripping jaw assembly for moving the gripping jaw assembly in the first horizontal direction, so that the lifted piece goods can be removed from or added to a storage place.

The operating device therefore operates according to a different gripping principle than typical operating devices for cuboidal medicament packs. The bottle-like piece good, for example, a bottle-like medicament pack, is not clamped or pulled but gripped from below by the gripping jaws and lifted. For this purpose, the alignment of the clamping jaw according to the present invention is necessary to ensure a stable position of the bottle-like piece goods on the gripping jaws. The inner surfaces of the profile-rod shaped gripping jaws at least in sections are configured in such a manner that a secure transport of the bottle-like piece goods in the "trough", which is defined by the inner surfaces of the rod-shaped gripping jaws, is ensured.

The gripping jaws may be configured as round profiles, so that the inner surfaces are configured in a convex manner to each other. The distance of the inner surfaces from each other at least in sections tapers in the downward direction, thus, the inner surfaces are configured in a round manner. A further advantage of the profile-rod shaped gripping jaws configured as a round profile is that they feature, in comparison to the typical clamping jaws, an increased stability, as a result of which a respective operating device is capable to also place and again retrieve bottle-like piece goods or medicament packs having an increased weight.

In one or more embodiments of the operating device, the gripping jaws may be configured as a flat profile having flat inner surfaces. Since it is necessary that the distance of the inner surfaces from each other at least in sections tapers in the downward direction, the flat profiles are positioned to each other in a V-shaped manner.

Bottle-like piece goods can be easily placed and retrieved using gripping jaws configured as a flat profile having flat inner surfaces, which are positioned in a permanent V-shaped manner; however, it is not possible or only possible with great difficulty to place and retrieve typical medicament packs, that is, such medicament packs having a rectangular base. In one or more embodiments, the gripping jaws may be rotatably mounted so that the gripping jaws with the aid of a second actuation unit are rotatable from a position gripping from below, in which the distance of the inner surfaces at least in sections tapers in the downward direction, into a clamping position, in which the inner surfaces of the gripping jaws, for example, are oriented parallel to each another. A correspondingly configured operating device makes it possible to place and retrieve the bottle-like medicament packs and also medicament packs having a rectangular base.

On account of the configuration of the gripping jaws, that is, on account of that the distance of the inner surfaces at least in sections tapers in the downward direction, it is possible to place and retrieve bottle-like medicament packs having very different diameters. However, for gripping jaws which have a predetermined distance to each other it is, even for the alignment of the inner surfaces according to the present invention, only possible to place and retrieve bottle-like medicament packs having a certain diameter or radius. If the diameter of the bottle-like medicament packs is too big, these medicament packs can no longer securely be stored in the trough formed by the inner surfaces having the distance tapering in the downward direction. If the diameter is too small, reaching from below is simply no longer possible because the gripping jaws are guided past the bottle-like medicament packs.

In one or more embodiments the operating device has a third actuation unit coupled to the gripping jaws, with which the gripping jaws are movable toward and away from each other along a second horizontal direction transverse to the first horizontal direction. For a correspondingly configured operating device, the gripping jaws can be adapted to the diameter of bottle-like configured medicament packs or piece goods. Even in the case in which the gripping jaws are rotatably mounted, thus, the operating device is suitable for placing and retrieving bottle-like medicament packs and typical medicament packs, a corresponding configuration is advantageous, since it enables to clamp-grip typical medicament packs having very different dimensions.

The gripping jaws of the operating device may be specifically designed so that a gripping from below and lifting of the bottle-like medicament packs is enabled. In order to achieve the previously mentioned object, a variation exists in which the bottle-like medicament packs are not lifted but pulled from the storage place. The typical operating devices are also used to pull typical medicament packs having rectangular bases from a storage place in the picking device; however, for this purpose, the medicament packs are clamp-gripped by pivoting the clamping jaws. On account of the plane circular bases of the bottle-like medicament packs, clamp-gripping is however to be dismissed—the clamping force would simply not suffice to pull medicament packs formed in such a manner, for example, from the storage location in the picking device.

One or more embodiments of an operating device include a tray extending in a first horizontal direction, which has a placing and a retrieving side. Such a tray is necessary, as the bottle-like piece goods or medicament packs are not to be lifted but pulled. Furthermore, the operating device includes a gripping jaw assembly having two gripping jaws movable toward and away from each other along a second horizontal direction transverse to first horizontal direction, the gripping jaws for carrying out the movement in the second horizontal direction being coupled to a third actuation unit, at least one of the gripping jaws being assigned to a pivot device which, at the end of a gripping jaw facing away from the gripping jaw assembly (thus, the terminal end) has a catching section, which for catching a piece good situated between the gripping jaws is pivotable into the area between the gripping jaws. The operating device further includes a sliding device for sliding a piece good from the tray, and an actuation unit coupled to the gripping jaw assembly for moving the gripping jaw assembly in the first horizontal direction. Different from the first alternative, in which the bottle-like medicament packs on account of the configuration of the gripping jaws according to the present invention are grippable from below, the bottle-like medicament packs are grippable from behind and pullable from a storage place by the operating device of the second alternative approach, since at least one pivot device is assigned to one of the gripping jaws, which can grip a bottle-like piece good to be retrieved from behind.

In the previously mentioned embodiments, it is not necessarily provided that the clamping jaws themselves are able to be pivoted, thus, that they can be moved in such a manner that the two terminal ends of the gripping jaws can be moved toward or away from each other, but that the ends of the gripping jaws assigned to the gripping jaw assembly are kept stationary. This can be advantageous, in particular, if bottle-like medicament packs and also typical medicament packs are to be stored. Thus, in one or more embodiments the gripping jaw assembly has a fourth actuation unit and at least one of the gripping jaws is pivotably mounted at the gripping jaw assembly and is pivotable via the fourth actuation unit.

In particular, when clamp-gripping and gripping bottle-like medicament packs from below, it can occur owing to the weight of the medicament packs that the gripping jaws bend, the exact type of bending depending on the action of force onto the gripping jaws. In an operating device having gripping jaws configured as a flat profile, the gripping jaws at least in sections have a web extending in the longitudinal direction, which prevents the gripping jaws from bending.

Figure 1B:
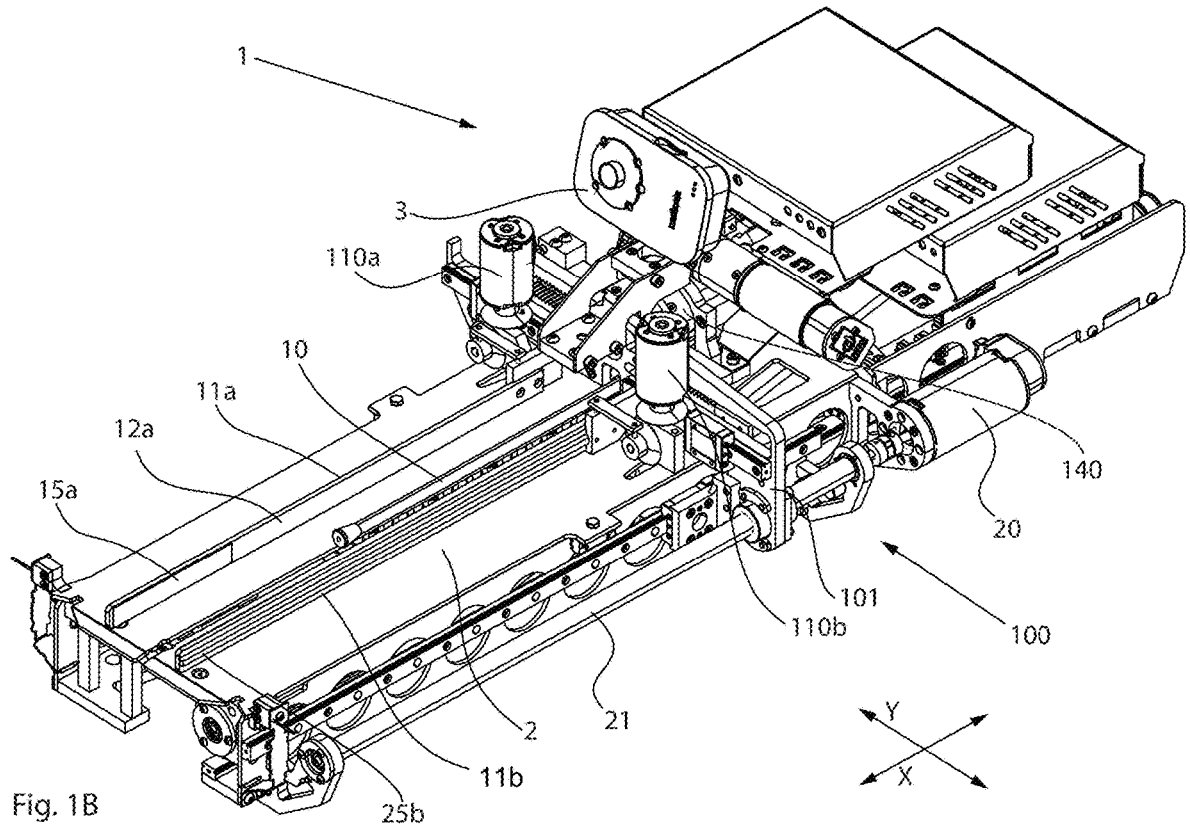

FIGS. 1A and 1B show two perspective views of an operating device 1. The operating device includes a first actuation unit 20 and gripping jaws 11a, 11b that are rotatably mounted, so that the gripping jaws 11a, 11b with the aid of a second actuation unit 110, formed by actuators 110a, 110b, are rotatable from a gripping position from below as shown in FIG. 1A. Thus, the distances A1, A2 of inner surfaces 12a and 12b (see FIG. 4) from opposite lying gripping jaws 11a, 11b tapers in the downward direction (e.g., the distance A1 between the tops of gripping jaws 11a, 11b is longer than the distance A2 between the bottoms of gripping jaws 11a, 11b), into a clamping position shown in FIG. 1B, in which the inner surfaces 12a, 12b of gripping jaws 11a, 11b are aligned parallel to each other. Gripping jaws 11a, 11b are part of gripping jaw assembly 100 having a central frame structure 101, to which two actuators 110a, 110b of the second actuation unit 110 are fastened. Gripping jaw assembly 100 and the positioning of actuators 110a, 110b at this gripping jaw assembly 100 is described in greater detail in reference of the subsequent figures.

The first actuation unit 20, which is part of a linear drive system, by which gripping jaw assembly 100 is movable along a first horizontal direction X, for the purpose of which the linear drive system includes a threaded spindle 21, through the rotational movement of which the gripping jaw assembly 100 can be moved along the first horizontal direction X. Between the two parallel gripping jaws 11a, 11b, a slider 10 is shown, which can be moved via an actuation mechanism (not shown) along the first horizontal direction X, in particular, the slider 10 can be used to slide "normal" medicament packs having a plane rectangular base from a tray 2 of the operating device 1 onto, for example, a storage place.

The operating device 1 is, owing to its special design, suitable to place and retrieve bottle-like medicament packs and also typical medicament packs. As already indicated above, the gripping jaws 11a, 11b are rotatably mounted, that is, they can be rotated from the position gripping from below for bottle-like medicament packs shown in FIG. 1A into the position shown in FIG. 1B, in which inner surfaces 12a, 12b of gripping jaws 11a, 11b are configured parallel to each other. In order to support the clamping effect of the gripping jaws 11a, 11b for placing and retrieving medicament packs, gripping jaw 11a at its end facing away from the gripping jaw assembly 100 may have section 15a having an increased friction. Gripping jaw 11b may have a corresponding section having increased friction. Here, the gripping jaw assembly 100 furthermore includes a sensor 3, by which for example the alignment of tray 2 at a storage surface can be determined. Furthermore, the operating device 1 includes a third actuation unit 140, the function of which is explained in greater detail in the subsequent figures.

In FIG. 1B, a web 25b can be seen for gripping jaw 11b, which extends in first horizontal direction X on the outer surface of the gripping jaw 11b and improves rigidity of the gripping jaw 11b, so that the gripping jaw 11b does not bend outwards when, for example, lifting a medicament pack. A corresponding web may be formed at the outer surface of gripping jaw 11a.

Figure 2A:
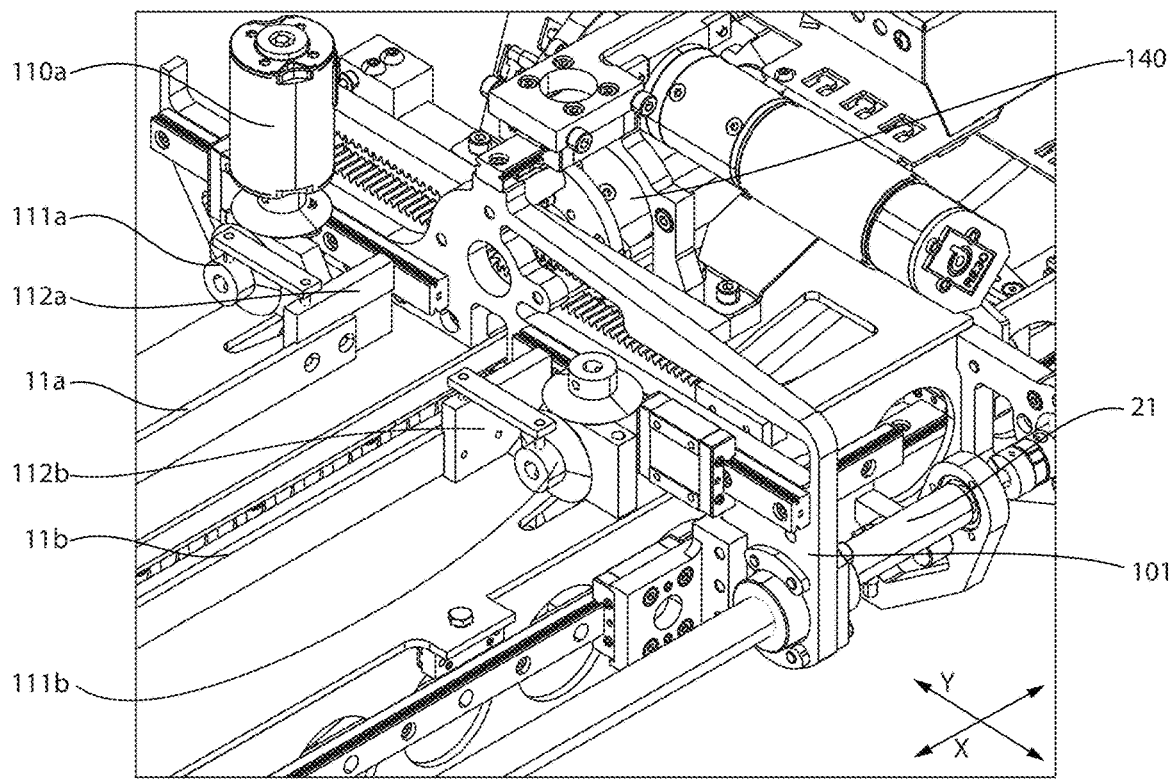
FIGS. 2A and 2B show detailed views of the operating device of FIGS. 1A and 1B.
Figure 2B:
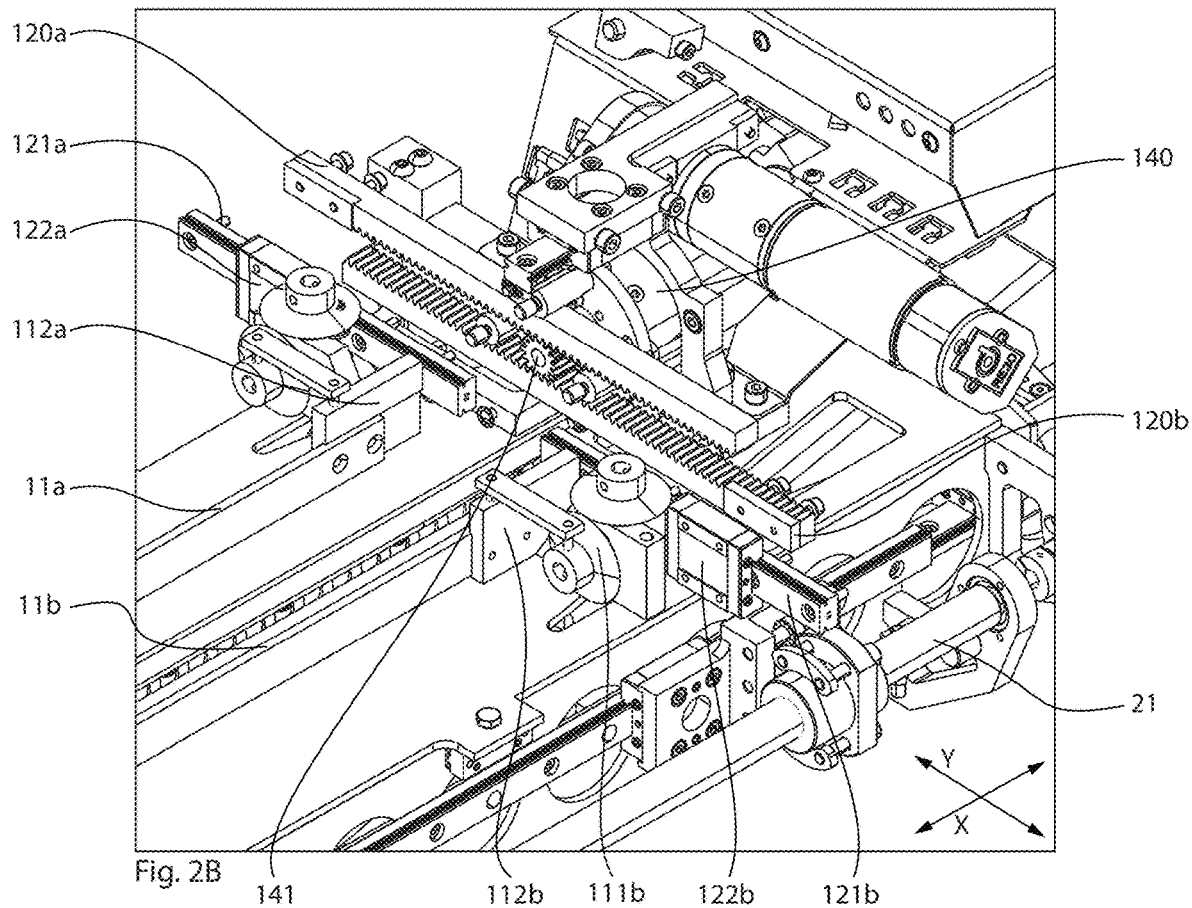
Figure 3:
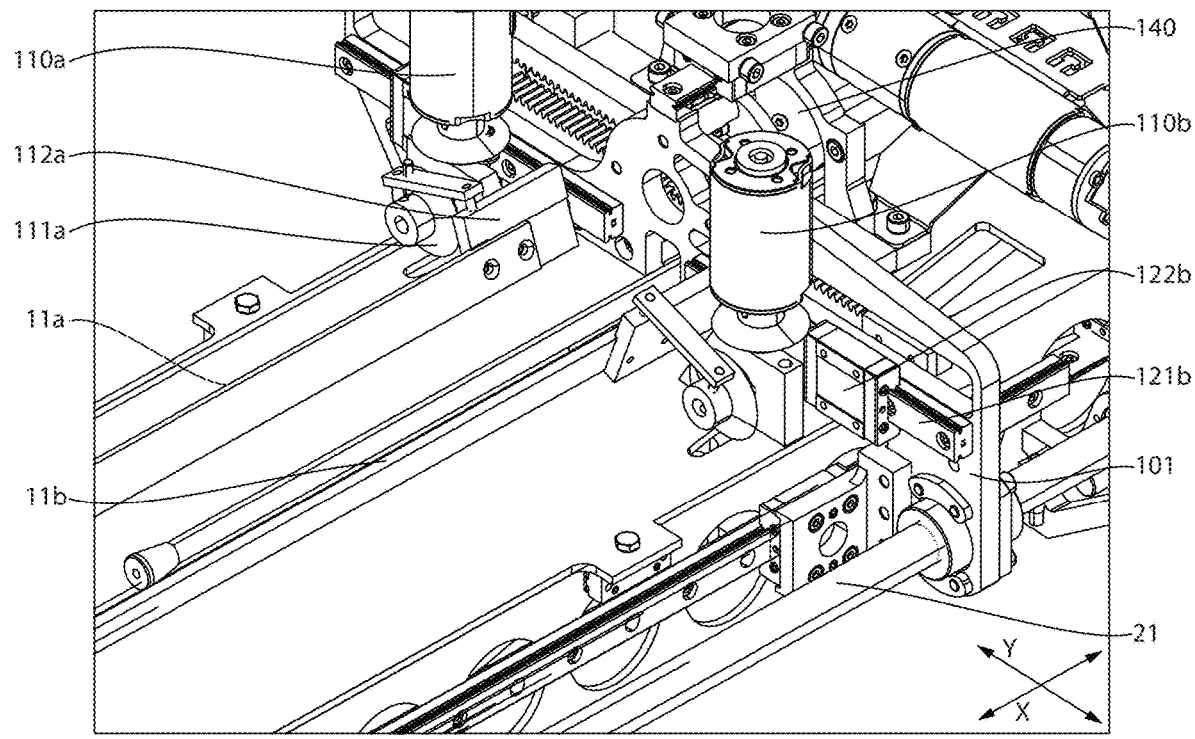
FIG. 3 shows a detailed view of the operating device of FIGS. 1A and 1B having rotated gripping jaws.

FIGS. 2A-4 show detailed views of the operating device 1 in the region of gripping jaw assembly 100, various components being omitted in FIGS. 2A and 2B for illustrating components otherwise concealed (i.e., actuator 110b in FIG. 2A and actuators 110a, 110b in FIG. 2B, as well as central frame structure 101). As can be seen from FIGS. 2A-4 (in particular illustrated in detail in FIG. 4), actuators 110a, 110b of the second actuation unit are coupled via a transmission 114a, 114b having rotators 111a, 111b, the rotary axis of which extends in first horizontal direction X. In turn, the rotators 111a, 111b are coupled via a web to gripping jaw holders 112a, 112b, to which gripping jaws 11a, 11b are attached. With the aid of actuators 110a, 110b, the rotators 111a, 111b can be moved in such a manner that the gripping jaws 11a, 11b can be moved from the position shown in FIGS. 2A and 2B into the position gripping from below shown in FIG. 3.

The gripping jaws 11a, 11b may be movable toward and away from each other along a second horizontal direction Y transverse to first horizontal direction X. For this purpose, the gripping jaws 11a, 11b and the actuators 110a, 110b assigned to them, the rotators 111a, 111b and the gripping jaw holders 112a, 112b are attached to respectively one gripping jaw slide 122a, 122b (see FIG. 2B). This gripping jaw slide 122a, 122b may be moved along a gripping jaw guide 121a, 121b in second horizontal direction Y. For this purpose, the gripping jaws 11a, 11b (including the components assigned to them) may be attached via the actuators 110a, 110b to gripping jaw actuation rods 120a, 120b, which may be configured as two toothed bars guided in parallel, having opposite profiles. Viewed from a vertical perspective, a gear wheel 141 coupled to the third actuation unit 140 is situated between gripping jaw actuation rods 120a, 120b. If this gear wheel 141 is rotated with the aid of the third actuation unit 140, the rotary movement of gear wheel 141 is transferred to the actuators 110a, 110b coupled to gripping jaw actuation rods 120a, 120b, as a result of which the gripping jaws 11a, 11b can be moved toward and away from each other along second horizontal direction Y transverse to first horizontal direction X.

FIG. 3 shows once again a detailed view of the position gripping from below, that is, of the position in which the gripping jaws 11a, 11b of the operating device 1 are moved in such a manner that at least in sections the distance of the inner surfaces 12a, 12b from each other is tapered in the downward direction, so that the inner surfaces 12a, 12b are configured in such a manner that the bottle-like piece goods can be lifted from below.

Figure 4:
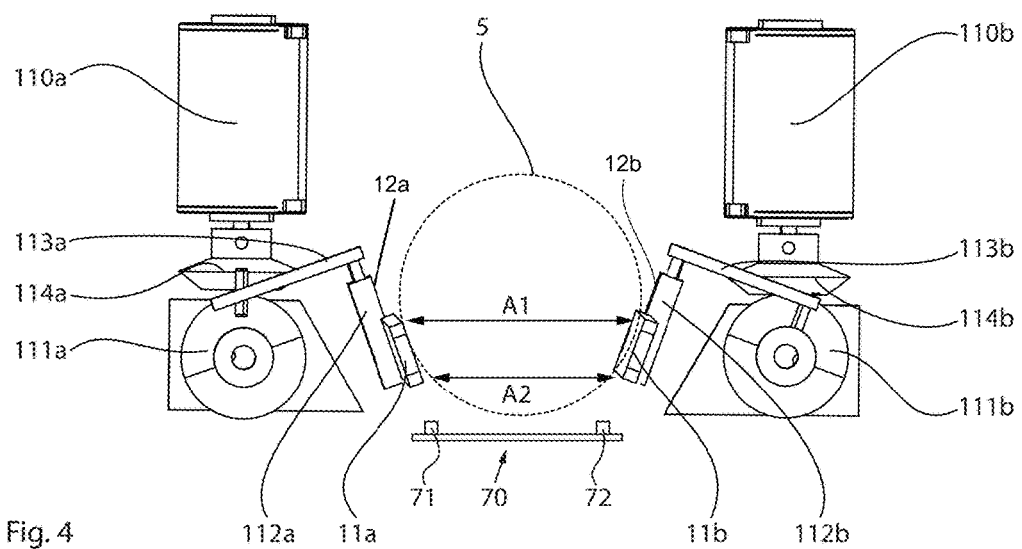
FIG. 4 shows a frontal view of the gripping jaws of FIG. 3 having a moving mechanism.

With the aid of a frontal view of the gripping jaws 11a, 11b including the associated actuation assemblies, FIG. 4 illustrates how bottle-like piece goods or medicament packs can be gripped by the gripping jaws 11a, 11b. As a function of the operating device 1, namely whether the gripping jaws 11a, 11b can be moved in second horizontal direction Y transverse to first horizontal direction X, bottle-like piece good 5 can be approached from below or from the side with the aid of the gripping jaws 11a, 11b and can be retrieved from a storage place by a vertical movement of the operating device 1. It can be concluded from FIG. 4 that gripping jaws 11a, 11b are attached to gripping jaw holders 112a, 112b, which, in turn, are attached via webs 113a, 113b to rotators 111a, 111b, which are coupled via a transmission 114a, 114b to actuators 110a, 110b. The operating device 1 makes it possible to place and retrieve bottle-like piece goods along their longitudinal direction. In this instance, it is required that a picking device is correspondingly adapted so that the bottle-like piece goods are securely stored in their storage places. For this purpose, it is for example conceivable that the storage places feature holders that are specifically adapted to the bottle-like piece goods. In the simplest case, for example, it can be provided that a storage place 70 has two parallel resting means 71, 72, which enable storing the bottle-like piece goods in the longitudinal direction. The exact type of storage of the bottle-like piece goods in the longitudinal direction in the picking device, however, is not part of this disclosure and, for this reason, shall only be briefly hinted at in a rudimentary manner.

Figure 5:
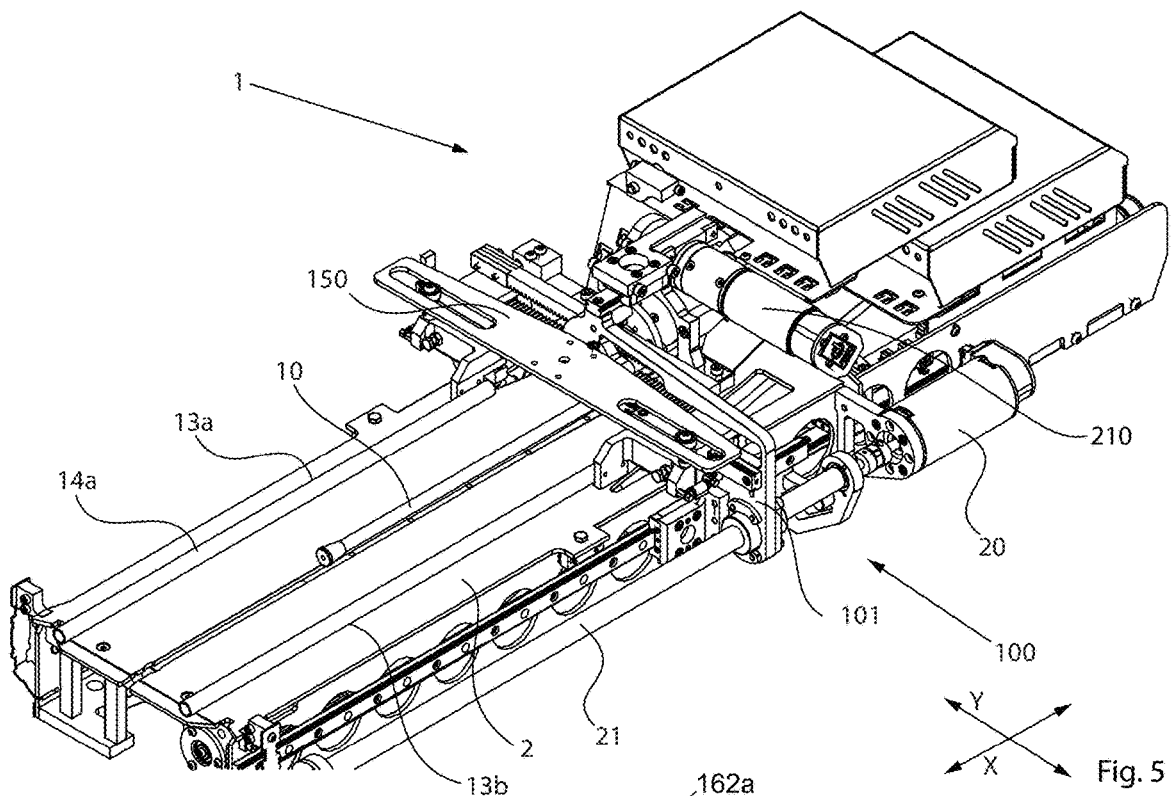
FIG. 5 shows a perspective view of one or more embodiments of an operating device.

FIG. 5 shows a perspective view of an operating device 1. Here, two gripping jaws 13a, 13b are configured as round profiles, which entails that inner surfaces 14a, 14b of the gripping jaws 13a, 13b are configured in a convex manner to each other. This type of configuration also fulfills the requirement that at least in sections the distance of the inner surfaces 14a, 14b from each other is tapered in the downward direction so that the inner surfaces 14a, 14b are configured in such a manner that the bottle-like piece goods can be lifted from below. The operating device 1 also includes a gripping jaw assembly 100 having a central frame structure 101. The gripping jaw assembly 100 furthermore includes an upper gripping jaw guide 150, which subsequently is described in greater detail in reference to FIG. 6.

Figure 6:
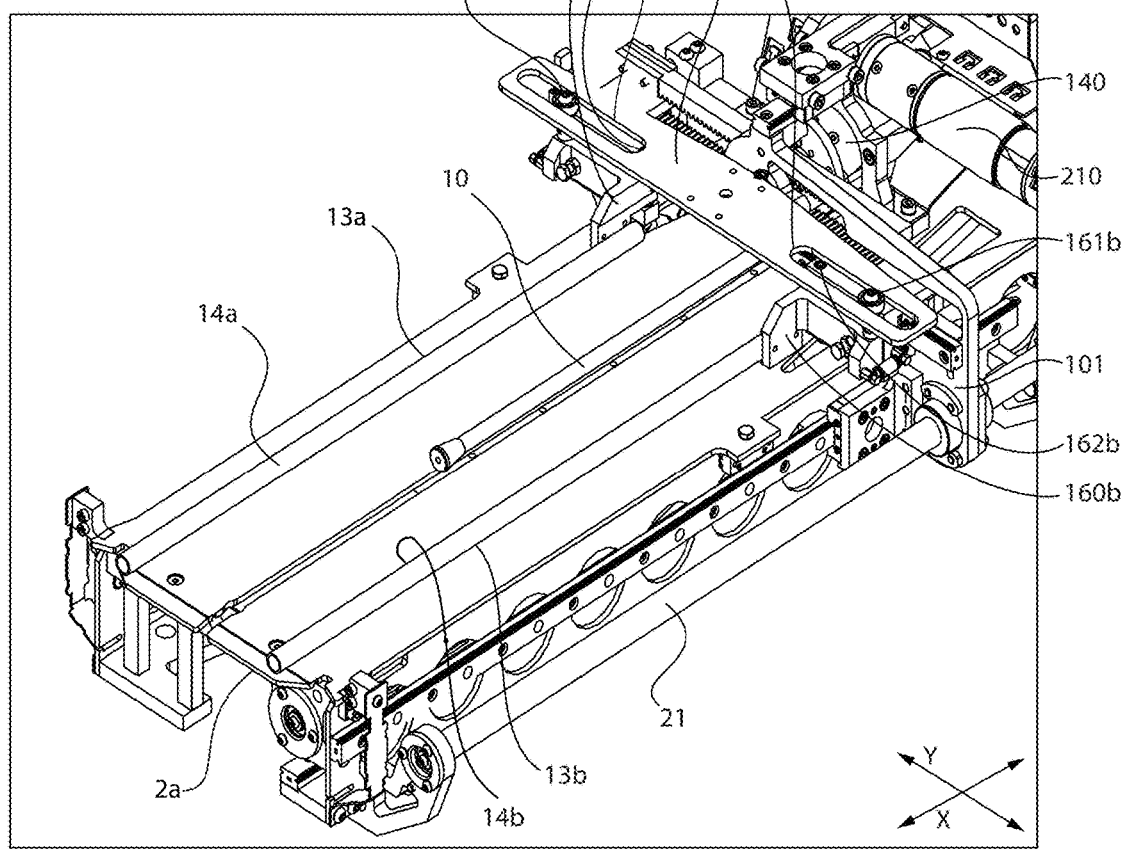
FIG. 6 shows a detailed view of the operating device of FIG. 5.

Upper gripping jaw guide 150 includes two elongated holes 151a, 151b configured in second horizontal direction Y, into each of which one nose 161a, 161b of a gripping jaw holder 160a, 160b engages. Gripping jaws 13a, 13b configured as round profiles are attached to gripping jaw holders 160a, 160b configured as L-shapes. As it is indicated in FIG. 6, L-shaped gripping jaw holders 160a, 160b are fastened to gripping jaw slides (not shown) via vertically running pivot axes 162a, 162b. By moving upper gripping jaw guide 150 in first horizontal direction X, a pivoting of gripping jaws 13a, 13b can be achieved on the basis of the pivotable mounting of gripping jaw holders 160a, 160b at the gripping slides (not precisely visibly in FIG. 6). By situating noses 161a, 161b in elongated holes 151a, 151b of upper gripping jaw guide 150 and holding the gripping jaw slides at the vertical pivot axes 162a, 162b, these pivot axes 162a, 162b are pivoted inwards at the terminal ends when moving the upper gripping jaw guide 150 in the direction of loading sill 2a of tray 2. The movement of upper gripping jaw guide 150 in first horizontal direction X is caused by a fourth actuation unit 210, as it is described in greater detail in reference to the subsequent figures.

Figure 7A:
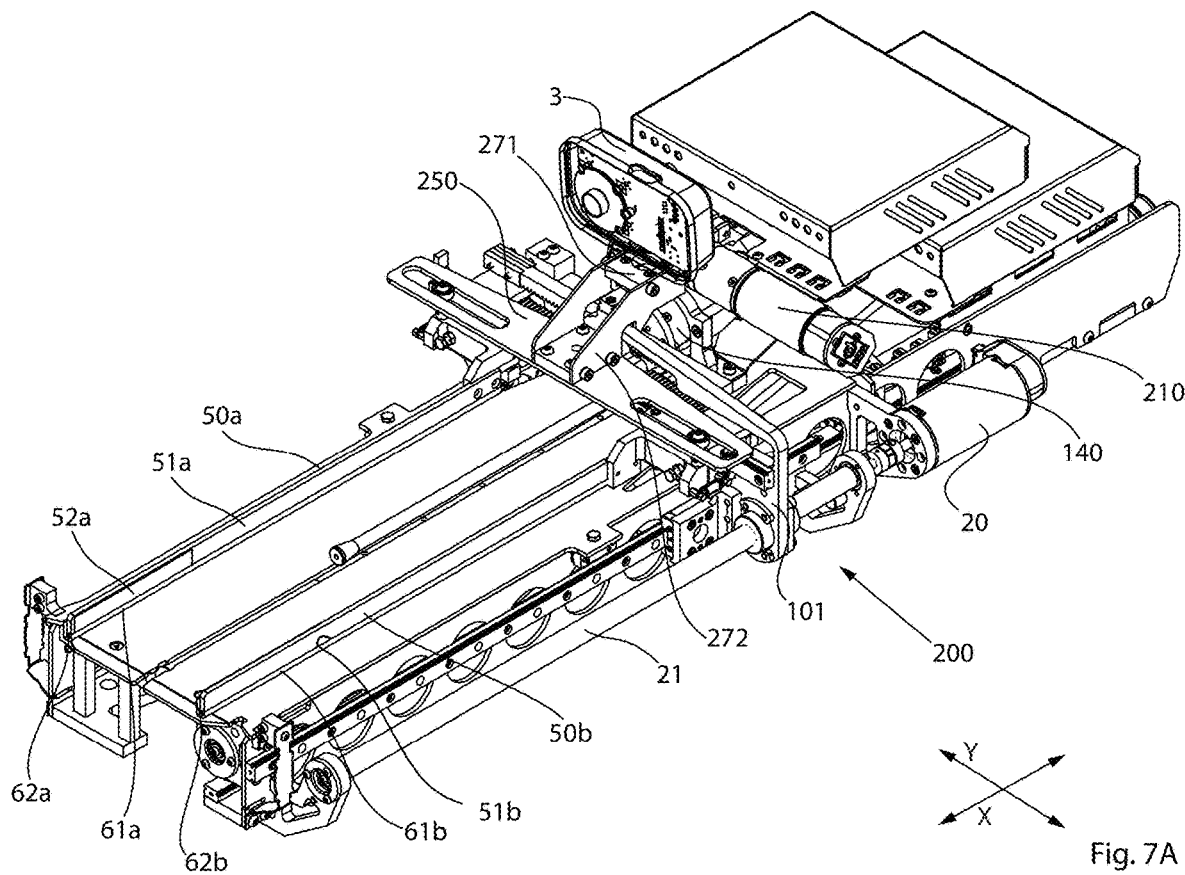
FIGS. 7A and 7B show perspective views of one or more embodiments of an operating device.
Figure 7B:
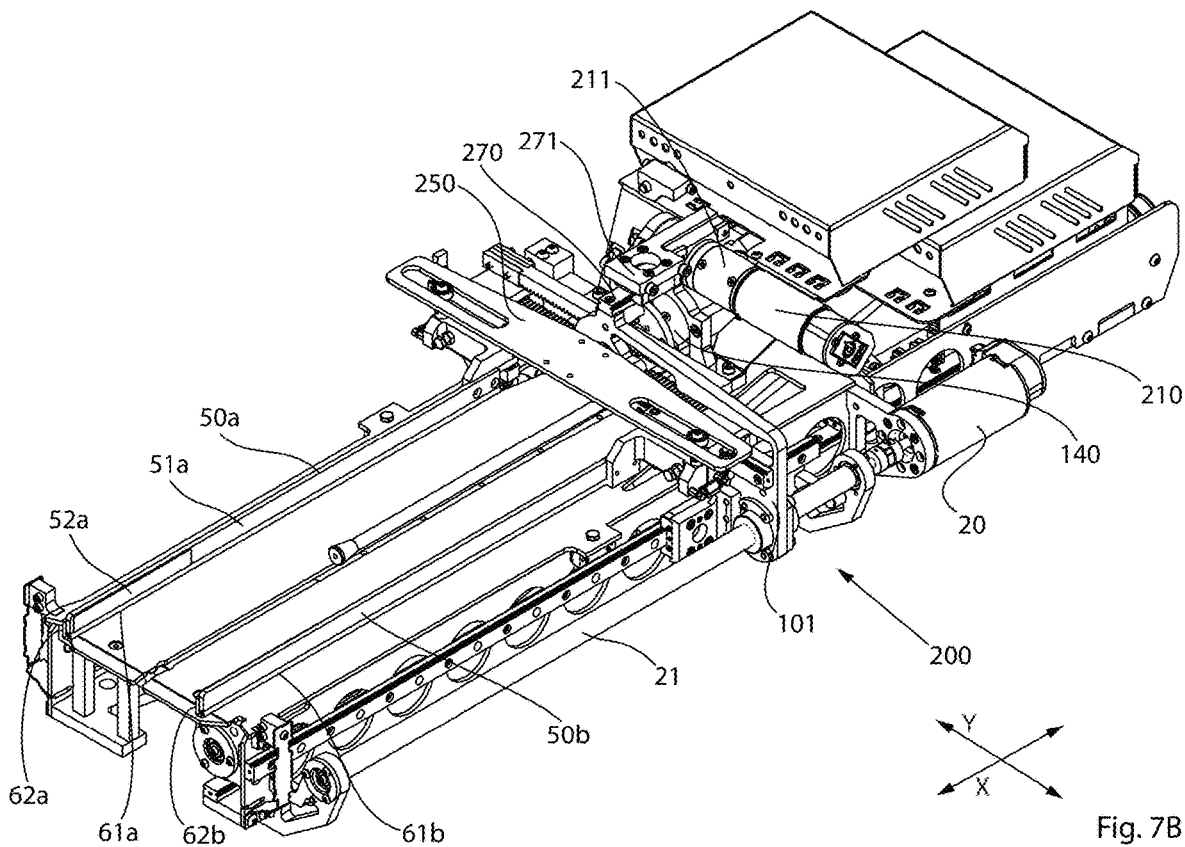

FIGS. 7A and 7B show perspective views of a variation of operating device 1. First the pivotability of the gripping jaws provided in this operating device 1 is described, which functions correspondingly in the operating device 1 shown in FIGS. 5 and 6.

As it can be concluded from FIG. 7A, behind or below sensor 3 a fourth actuation unit 210 is provided. As it can be concluded from FIG. 7B, fourth actuation unit 210 is coupled via a coupling piece 211 to slide 271, which with the aid of the actuation unit 210 can be moved on a guide 270 in first horizontal direction X. Slide 271, which, as can be concluded from FIG. 7A, carries sensor 3, is connected via coupling elements 272 to an upper gripping jaw guide 250. Via coupling elements 272, the movement of slide 271 in the first horizontal direction X is transferred to upper gripping jaw guide 250, which moves accordingly. Section 52a of gripping jaw 50a, and a corresponding section of gripping jaw 50b may have an increased friction.

FIG. 8 shows a top view onto gripping jaw assembly 200 and it being coupled to fourth actuation unit 210. As can be concluded from FIG. 8, noses 261a, 261b extend from L-shaped gripping jaw holders 260a, 260b in elongated holes 251a, 251b, which are formed in upper gripping jaw guide 250. If the upper gripping jaw guide 250 is moved forward by fourth actuation unit 210 (in FIG. 8 moved downward), the L-shaped gripping jaw holders 260a, 260b, which are fixed via vertical pivot axes 262a, 262b (see FIGS. 9A and 9B) at gripping jaw slides 222a, 222b, are pivoted by catching the noses 261a, 261b of the gripping jaw holders 260a, 260b, so that the ends of the gripping jaws 50a, 50b remote from the gripping jaw assembly 200 (thus, the terminal ends) are pivoted towards each other.

FIGS. 9A and 9B show detailed views of the gripping jaw assembly 200 and it being coupled to fourth actuation unit 210. Via a coupling 211, fourth actuation unit 210 is coupled with slide 271 movable in first horizontal direction X, which is movable on guide 270. Via coupling elements 272, which is only indicated in FIG. 8, the movement in first horizontal direction X is transferred to the upper gripping jaw holder 260a, 260b. As can be concluded from FIGS. 9A and 9B, the gripping jaws 50a, 50b are not only pivotable, but they can also be moved along second horizontal direction Y. For this purpose, gripping jaw slides 222a, 222b are attached to gripping jaw actuation rods 220a, 220b, which can be moved via a gear wheel 141 of third actuation unit 140 along second horizontal direction Y. The movement of gripping jaw slides 222a, 222b is transferred to L-shaped gripping jaw holders 260a, 260b. As can be concluded from FIGS. 9A and 9B, these gripping jaw holders 260a, 260b are coupled via vertical axes 262a, 262b to the gripping jaw slides. In turn, gripping jaws 50a, 50b are attached to the gripping jaw holders 260a, 260b. The special type of coupling the gripping jaws 50a, 50b within the gripping jaw assembly 200 enables that the gripping jaws 50a, 50b along second horizontal direction Y are movable as well as also pivotable.

Figure 10A:
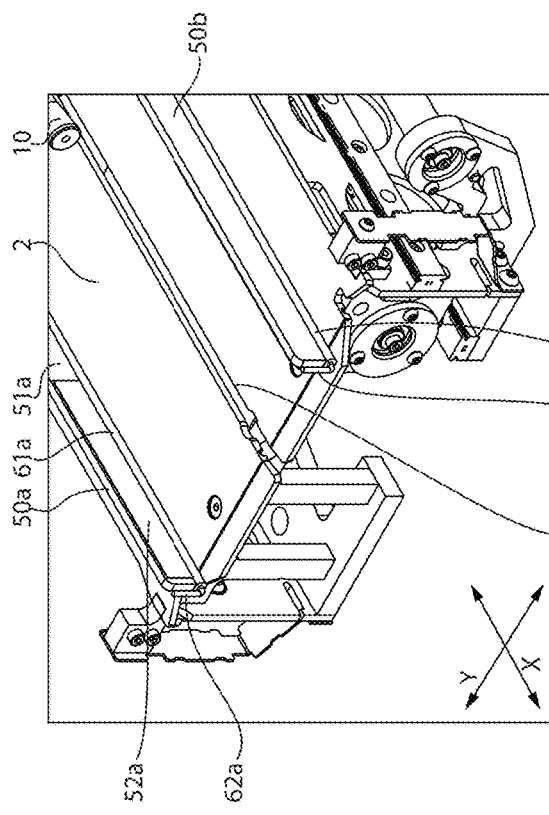
FIGS. 10A through 10D show detailed views of the operating device of FIGS. 7A and 7B.
Figure 10B:
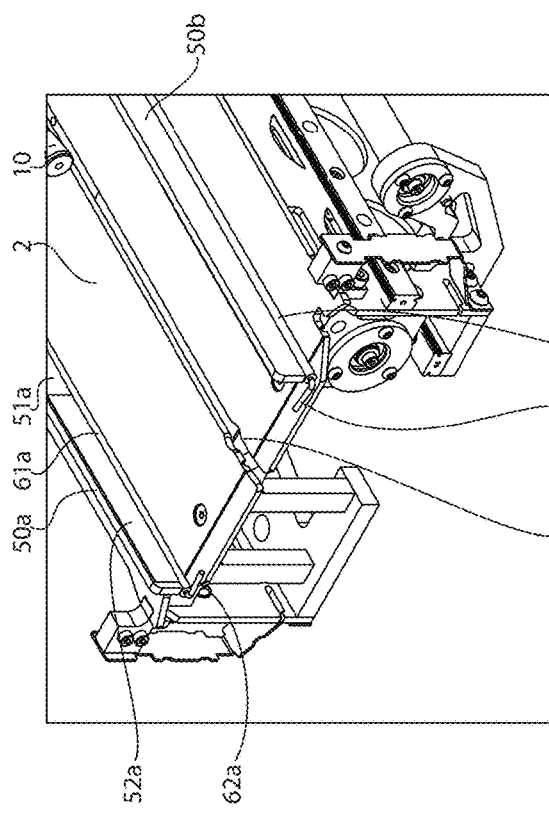

In reference to FIGS. 10A-10D, showing detailed views of the ends of the gripping jaws 50a, 50b facing away from the gripping jaw assembly 200, pivot devices assigned to the gripping jaws 50a, 50b are described, these pivot devices already being shown in FIGS. 7A and 7B; however, they have not been discussed within the context of these figures. As can be concluded from FIG. 10A, respectively one pivot device is assigned to gripping jaws 50a, 50b configured as a flat profile, which in the shown embodiment includes a guide 61a, 61b extending in first horizontal direction X. A pivot element 62a, 62b is guided through this guide 61a, 61b, each of the pivot elements 62a, 62b having at its terminal end a catching section angled by approximately 90° in regard to the longitudinal direction, which in FIG. 10A is vertically aligned at the ends of the gripping jaws 50a, 50b. The pivot elements are rotatable via (not shown) actuators, the catching section via this rotary movement, as it is shown in FIG. 10B, can be rotated into the region between inner surfaces 51a, 51b of the clamping jaws. In order to pull a bottle-like medicament pack resting on a storage place from this storage place using the gripping jaws 50a, 50b, the catching sections, as soon as the gripping jaws 50a, 50b have been moved into the correct position in reference to the first horizontal direction X, are pivoted into the region between the gripping jaws 50a, 50b and, in so doing, when the gripping jaws 50a, 50b are accordingly aligned, are gripping the usually circularly configured base of the medicament packs from behind. As soon as a corresponding gripping from behind is configured, the bottle-like medicament packs can be pulled from the storage location, the parallel gripping jaws 50a, 50b serving as guides.

Figure 10C:
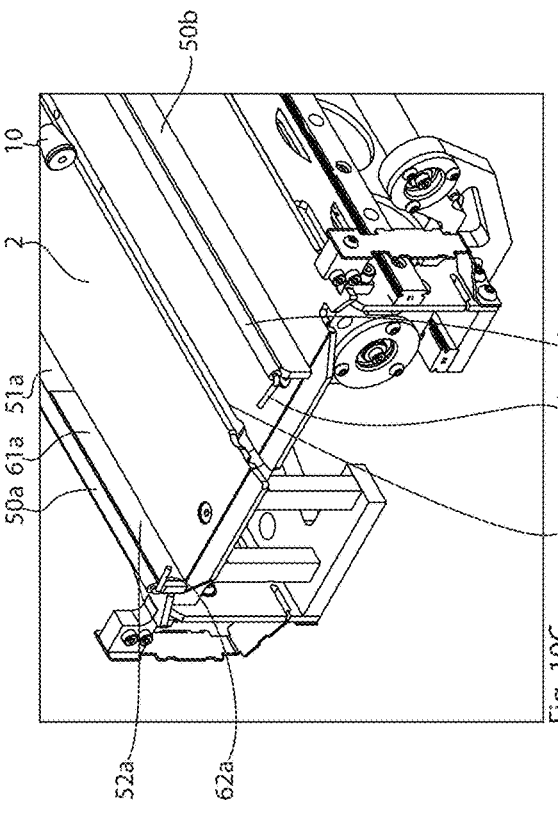
Figure 10D:
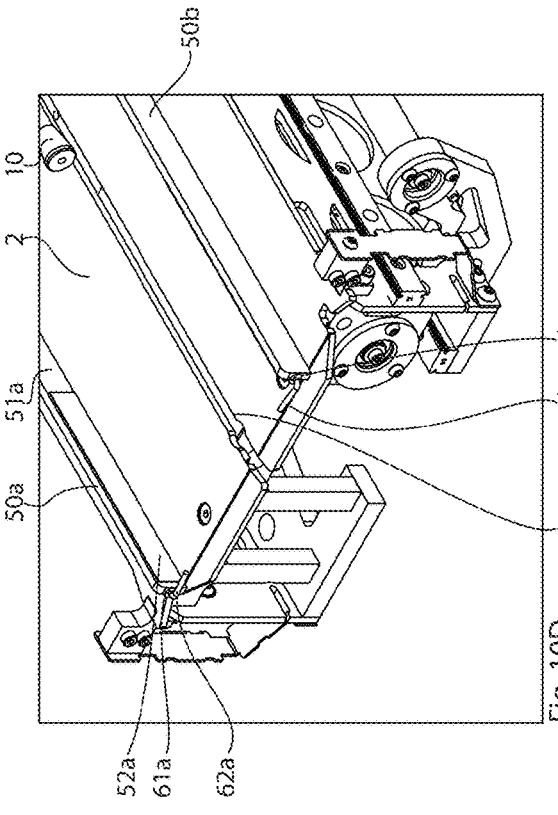

In the operating device 1 shown in FIG. 10A, guides 61a, 61b, through which pivot elements 62a, 62b extend, are situated below the actual gripping jaws. In some variations, it is of course possible that guides 61a, 61b are situated above actual gripping jaws 50a, 50b, as indicated in FIG. 10C. Pivots elements 62a, 62b can also be guided through the gripping jaws 50a, 50b, the recesses in the gripping jaws 50a, 50b forming the guides 61a, 61b. Tray 2 may include a slot 11, thereby allowing for a pushing device (not shown) to enter into and retract from the space above the tray 2.

The pivot device, for example, can also be combined with the rod-shaped gripping jaws 13a, 13b. In this case it possibly lends itself to guiding the pivot elements 62a, 62b through the gripping jaws 50a, 50b formed as a round profile.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A method of moving piece goods, the method comprising:
    moving a gripping jaw assembly comprising first and second gripping jaws disposed opposed to each other along a lengthwise axis, the first and second gripping jaws having inner surfaces, wherein a distance between upper portions of the inner surfaces is greater than a distance between lower portions below the upper portions of the opposed inner surfaces in a first position of the first and second gripping jaws, wherein the moving comprises moving by a first actuation unit the gripping jaw assembly along the lengthwise axis toward a storage place having one or more piece goods;
    moving, by the first actuation unit, the first and second gripping jaws adjacent a first piece good disposed in a first location of the storage place, wherein the first piece good is one of having a rectangular base and cylindrical;
    engaging, by the first and second gripping jaws, the first piece good by:
        rotating, by a second actuation unit, the first and second gripping jaws from the first position into a second position in which the inner surfaces of the first and second gripping jaws are aligned parallel to each other;
        moving, by a third actuation unit, the first and second gripping jaws toward each other along a widthwise axis transverse to the lengthwise axis; and
        clamping the first piece good between the first and second gripping jaws; and
    moving, by the first actuation unit, the first and second gripping jaws away from the first location of the storage place to remove the first piece good from the first location of the storage place.

2. The method of claim 1, wherein the first piece good is cylindrical and engaging the first cylindrical piece good in the first location of the storage place comprises:
    lifting, by the first and second gripping jaws, the first cylindrical piece good from below.

3. The method of claim 1, further comprising:
    pivoting, by a fourth actuation unit, at least one of the first and second gripping jaws so that terminal ends of the first and second gripping jaws are moved toward each other.

4. The method of claim 1, wherein the first and second gripping jaws each have a flat profile with the inner surface being a plane inner surface.

5. The method of claim 4, wherein at least a portion of one of the first and second gripping jaws comprises a web extending along the lengthwise axis.

6. The method of claim 1, wherein the first and second gripping jaws each have a round profile and the opposed inner surfaces are convex to each other.

7. The method of claim 1, further comprising:
    moving the first piece good to a second location of the storage place, and
    sliding, by a sliding device, the first piece good onto the second location.

8. The method of claim 1, further comprising:
    catching, by a catching section at an end of the first gripping jaw, the first piece good between the first and second gripping jaws, and
    pulling the first piece good from the storage place onto a tray disposed below the first and second gripping jaws.

9. The method of claim 8, further comprising:
    moving the gripping jaw assembly and the tray to a second location of the storage place and
    sliding, by a sliding device, the first piece good onto the second location.

10. The method of claim 1, further comprising:
    moving, by the first actuation unit, the first and second gripping jaws to a second location in the storage place; and
    disengaging, by the first and second gripping jaws, the first piece good to place the first piece good in the second location of the storage place.

11. The method of claim 1, further comprising:
    moving, by the first actuation unit, the first and second gripping jaws to a second location not in the storage place; and
    disengaging, by the first and second gripping jaws, the first piece good to place the first piece good in the second location.

12. A method of moving cylindrical piece goods, the method comprising:
    moving a gripping jaw assembly comprising first and second gripping jaws disposed opposed to each other along a lengthwise axis, the first and second gripping jaws having inner surfaces, wherein a distance between upper portions of the inner surfaces is greater than a distance between lower portions of the opposed inner surfaces in a first position of the first and second gripping jaws, wherein the moving comprises moving, by a first actuation unit, the gripping jaw assembly along the lengthwise axis toward a storage place having one or more piece goods;

lifting, by the first and second gripping jaws, a first cylindrical piece good from below;

catching, by a catching section at an end of the first gripping jaw, the first cylindrical piece good between the first and second gripping jaws;

moving, by the first actuation unit, the first and second gripping jaws to move the first cylindrical piece good to a different location; and pulling the first cylindrical piece good onto a tray disposed below the first and second gripping jaws.

13. The method of claim 12, further comprising:

sliding, by a sliding device, the first piece good onto the different location.

14. The method of claim 12, wherein the opposed inner surfaces are convex to each other.

15. The method of claim 12, wherein the first and second gripping jaws each have a flat profile with the inner surface being a planar inner surface.

16. The method of claim 12 wherein the different location is not in the storage place.

17. A method of moving piece goods, the method comprising:

moving a gripping jaw assembly comprising first and second gripping jaws disposed opposed to each other along a lengthwise axis, the first and second gripping jaws having inner surfaces, wherein a distance between upper portions of the inner surfaces is greater than a distance between lower portions below the upper portions of the opposed inner surfaces in a first position of the first and second gripping jaws, wherein the moving comprises moving by a first actuation unit the gripping jaw assembly along the lengthwise axis toward a storage place having one or more piece goods;

moving, by the first actuation unit, the first and second gripping jaws adjacent a first piece good disposed in a first location of the storage place;

engaging, by the first and second gripping jaws, the first piece good;

catching, by a catching section at an end of the first gripping jaw, the first piece good between the first and second gripping jaws;

moving, by the first actuation unit, the first and second gripping jaws away from the first location of the storage place to remove the first piece good from the first location of the storage place; and pulling the first piece good from the storage place onto a tray disposed below the first and second gripping jaws.

\* \* \* \* \*